(12) United States Patent
Smith et al.

(10) Patent No.: US 6,588,861 B2
(45) Date of Patent: Jul. 8, 2003

(54) ENDLESS DRIVE TRACKS AND WHEELS THEREFORE

(75) Inventors: Eric Brian Smith, Independence, IA (US); Craig Edward Rehmert, Jesup, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/003,892

(22) Filed: Oct. 25, 2001

(65) Prior Publication Data

US 2003/0080616 A1 May 1, 2003

(51) Int. Cl.$^7$ ................ B60B 25/00; B60B 11/00; B62D 55/10
(52) U.S. Cl. ............... 305/136; 301/13.2; 301/40.2; 152/396
(58) Field of Search ................ 305/136, 137, 305/195, 199; 301/13.1, 13.2, 36.1, 39.1, 40.1, 40.2; 152/393, 394, 396, 397, 398, 402

(56) References Cited

U.S. PATENT DOCUMENTS

| | | | |
|---|---|---|---|
| 467,769 A | 1/1892 | Challiner | |
| 615,059 A | 11/1898 | Davidson | |
| 908,475 A | * 1/1909 | Midgley et al. | |
| 1,009,529 A | 11/1911 | Koken | |
| 1,117,134 A | * 11/1914 | Koken | |
| 1,216,474 A | * 2/1917 | Lindsay | |
| 1,230,616 A | * 6/1917 | Stevenson | |
| 1,287,682 A | 12/1918 | Harloe | |
| 1,336,130 A | 4/1920 | Christie | |
| 1,804,470 A | 5/1931 | Knox | |
| 1,814,623 A | 7/1931 | Finnell | |
| 1,838,164 A | 12/1931 | Tannewitz | |
| 2,233,562 A | 9/1941 | Tannewitz | 74/230.24 |
| 2,764,213 A | 9/1956 | Simpson | 152/323 |
| 2,970,867 A | * 2/1961 | Ruf | |
| 2,992,863 A | 7/1961 | Fredricks et al. | 305/57 |
| 3,871,719 A | 3/1975 | Boggs | 305/28 |
| 3,996,810 A | 12/1976 | Groff | 74/230.3 |
| 4,457,388 A | 7/1984 | Koehler et al. | 180/9.48 |
| 4,560,018 A | 12/1985 | Satzler | 180/9.1 |
| 5,131,731 A | 7/1992 | Johnson | 305/56 |
| 5,161,866 A | 11/1992 | Johnson | 305/24 |
| 5,288,143 A | 2/1994 | Dester et al. | 305/56 |
| 5,302,012 A | 4/1994 | Dester et al. | 305/56 |
| 5,368,115 A | * 11/1994 | Crabb | 180/9.1 |

* cited by examiner

Primary Examiner—Russell D. Stormer
(74) Attorney, Agent, or Firm—Wilhelm Law Service; Thomas D. Wilhelm

(57) ABSTRACT

Novel wheel assemblies for use in track drive systems in a tracked vehicle, in support of improving uniformity of pressure distribution across the width of the track, between the track and the underlying ground surface, where track installed on the vehicle is wider than the wheel bodies which are supplied as original equipment with the tracked vehicle. Such improved uniformity of pressure is achieved by adding, to the wheels of such tracked vehicle, auxiliary wheel bodies which extend the widths of the wheels to widths more reflective of the width of the track being used in such vehicle. In cases where different track widths are sequentially employed on a given vehicle, auxiliary wheel assemblies of respective different widths can be sequentially mounted, removed, and the like to reflect the widths of the tracks being employed.

28 Claims, 4 Drawing Sheets

ENDLESS DRIVE TRACKS AND WHEELS THEREFORE

BACKGROUND

This invention relates generally to wheel assemblies, and especially to wheel assemblies which are employed in ground-engaging drive systems which are used in e.g. tracked vehicles and in endless belt conveyors. While the disclosure herein focuses on tracked vehicles and endless track drive systems for such vehicles, it will be understood that the invention can be employed in other endless track drive systems.

Ground-engaging endless track drive systems in tracked vehicles employ a plurality of wheel assemblies to define a track path, which path is beneficially traversed by the track in causing the vehicle to move along the ground. Such track drive systems can include, for example and without limitation, on each side of the vehicle, a drive wheel assembly disposed adjacent e.g. the rear of the vehicle, an idler wheel assembly disposed adjacent e.g. the front of the vehicle, and one or more mid-roller wheel assemblies backing up the ground-engaging surface of the track between the drive wheel assembly and the idler wheel assembly.

In some embodiments, such track systems employ, as an additional element, one or more separate and distinct tensioning wheel assemblies in e.g. an upper portion of the track path. In other embodiments, the tensioning function is integrated into the operation of one or more of the other wheel assemblies, as a secondary function in addition to the primary function of the respective wheel assembly.

The structures of the several wheel assemblies are typically designed and configured according to the specific uses for which each such wheel assembly is to be employed. Accordingly, drive wheel assemblies are structured for their driving function.

Idler wheel assemblies are structured for their function of performing a significant angle turn of the track, and typically are structured to perform or assist with functions related to steering the direction of movement of the vehicle. Since the idler wheel assembly generally does not bear the stresses of driving the vehicle, on a given vehicle, the idler wheel assemblies are typically less complex, and may be less robust, than the drive wheel assemblies.

Mid-roller wheel assemblies are structured and mounted to provide downwardly-directed support of the underlying track, and thus can be spring loaded from the frame for such support of the endless track. Mid-roller wheel assemblies generally do not perform driving or steering functions.

Similarly, tensioning wheel assemblies, not shown in the drawings, are structured for typically upwardly-directed support of the track, and thus are also typically designed to be spring loaded from the frame. As with mid-roller wheel assemblies, tensioning wheel assemblies generally do not perform driving or steering functions.

Thus, while the drive wheel assemblies and the idler wheel assemblies, which perform driving and steering functions, are typically relatively more robust, and can be more complex, mid-roller wheel assemblies and tensioning wheel assemblies typically perform less demanding functions and thus can be somewhat less robust and may be simpler in design.

A variety of track widths are available for use with tracked vehicles. The typical practice in designing track drive assemblies for mass production of such vehicles is to provide wheels having a single common width in all such vehicles, irrespective of the track width which may be employed on a specific vehicle. The track width, on the other hand, is commonly specified on the basis of the anticipated use for which a particular vehicle is expected to be used. Exemplary of one factor which is commonly considered when specifying track width is weight bearing properties of the underlying surface over which the vehicle is to be used. Another factor is the ability of the project or operation to tolerate compaction of the underlying surface, e.g. soil. Still another factor is the traction properties of the underlying surface.

Thus, for example, a vehicle may be designed and constructed to receive an 8-inch wide track while some customers of such vehicles need to employ, for example and without limitation, 12-inch, 16-inch, or 24-inch wide tracks. Conventional practice is to retain, on the vehicle, the wheels built for the lesser width track (e.g. 8 inches) and to mount the wider width track on such wheels. However, in employing such strategy, the full benefit of the wider track is not achieved. Namely, the e.g. 16-inch wide track is mounted about the 8-inch wide wheels with e.g. the inner 8 inches of the track engaging the wheels while the remaining outer 8 inches of the track are not supported except from the inner 8-inches of the track.

Such cantilever arrangement of the additional width of the track can result in minor twisting of the track; and in the track accordingly applying an uneven pressure to the underlying e.g. soil, across the width of the track, whereby the e.g. outer unsupported portions of the track apply relatively less pressure to the underlying soil while the inner supported portions of the track apply relatively greater pressure to the underlying soil. Such uneven pressure partially compromises the above objectives of track design, namely attenuation of soil compaction, increased traction, improved distribution of weight, and the like.

It is desirable to have the track, as nearly as feasible on e.g. uneven surfaces over which tracked vehicles are commonly used, apply the same pressure to all areas of the soil or other surface over which the vehicle is run.

It is yet another objective to have the track, as nearly as feasible, run flat so as to avoid twisting of the track.

It is accordingly an object of the invention to provide an auxiliary wheel body to the wheel assembly whereby the auxiliary wheel body enables the resulting wheel assembly to accommodate and support a track which is wider than the main wheel body supplied as original equipment with the vehicle.

It is another object to provide a wheel assembly employing such auxiliary wheel body.

It is a further object to provide an endless track drive system employing such auxiliary wheel body on at least one of the wheel assemblies supporting the track.

It is still further an object to provide a tracked vehicle employing a track drive system having at least one wheel assembly which employs such auxiliary wheel body.

SUMMARY

This invention comprises novel wheel assemblies for use in track drive systems in tracked vehicles, in support of improving uniformity of pressure distribution across the width of the track, between the track and the underlying ground surface, where track installed on the vehicle is wider than the wheel bodies which are supplied as original equipment with the tracked vehicle. Such improved uniformity of pressure is achieved by adding to the wheels of such tracked vehicle auxiliary wheel bodies which extend the widths of the wheels to widths more reflective of the width of the track being used in such vehicle. In cases where different track widths are sequentially employed on a given vehicle, auxiliary wheel assemblies of respective different widths are sequentially mounted, removed, and the like to reflect the widths of the tracks being employed.

To that end, the invention contemplates a wheel assembly for use in an endless track drive system. The wheel assembly comprises a wheel, which comprises a main wheel body and an auxiliary wheel body. The main wheel body has a first center of rotation, an inner flange defining a central opening for mounting the main wheel body to an axle for rotation of the wheel on such axle and about the first center of rotation, an outer flange having an outer surface, an inner surface, and first and second opposing sides, a first width of the outer surface between the first and second sides, and a web connecting the inner flange to the outer flange. The outer flange has a first overall width between the first and second opposing sides.

The auxiliary wheel body has an annular structure defining a second inner surface, a second outer surface, third and fourth opposing sides, and a second width of the outer surface between the third and fourth sides. The auxiliary wheel body is removably mounted to the main wheel, body, with the third side surface of the auxiliary wheel body disposed against the second side surface of the main wheel body. The combination, of the first width of the main wheel body and the second width of the auxiliary wheel body, defines a third overall width of the outer surface of the wheel. The third overall width is at least about 30 percent greater than the first width, preferably at least 50 percent greater, than the overall width of the main wheel body. In the illustrated embodiment, the overall width is 100 percent greater. The overall width can be multiples of the width of the main wheel body. For example, where the main wheel body is structured to support an 8-inch wide track, the auxiliary wheel body can provide structure capable of supporting a track up to 24 inches wide, or greater.

The auxiliary wheel body has a second center of rotation axially aligned with the first center of rotation.

The first and second outer surfaces of the main wheel body and the auxiliary wheel body in combination define an outer surface of the wheel having a generally common outer diameter, a central portion, and opposing ends at the first side of the main wheel body and the fourth side of the auxiliary wheel body.

The wheel assembly further comprises a tire comprising one or more tire bodies. The tire has an exterior. The tire exterior comprises an inner surface, an outer surface, and first and second side surfaces extending generally from the outer surface toward the inner surface. Each tire body comprises a plurality of cables proximate the inner surface of the tire body, embedded in the elastomeric material. The cables in combination are effective to strengthen the tire body and to limit radial stretching of the tire body.

The outer surface of the wheel receives the inner surface of the tire thereon at a wheel-tire interface.

The wheel assembly further comprises a first side flange at the first side of the main wheel body extending outwardly of the outer surface of the wheel to a distal edge inward of the outer surface of the tire, the first side flange comprising a first abutment surface facing away from the first side surface, and a second side flange at the fourth side of the auxiliary wheel body extending outwardly of the outer surface of the wheel to a distal edge inward of the outer surface of the tire, the second side flange comprising a second abutment surface facing inwardly of the fourth side surface. The second side flange, in some embodiments, faces the fourth side surface directly, as well as facing inwardly of the fourth side surface and toward the center of the outer surface of the wheel.

The first and second abutment surfaces of the first and second side flanges abut the first and second side-facing surfaces of the tire, thereby to effectively impede transverse movement of the tire off the wheel while the auxiliary wheel body is mounted to the main wheel body, while releasing such impediment such that the tire bodies can be removed transversely from the wheel when the auxiliary wheel body is dismounted from the main wheel body, and enabling subsequently sliding fresh such tire bodies onto the outer surface of the main wheel body and the auxiliary wheel body followed by again removably mounting the auxiliary wheel body to the main wheel body.

In some alternative but not exclusionary embodiments, the difference between magnitudes of the first and second diameters is greater than the radial stretch capability of the combination of the cables and the elastomeric material in the tire, thereby to prevent transverse movement of the tire off the wheel while the auxiliary wheel body is mounted to the wheel.

In some embodiments, the tire comprises a single tire body.

In other embodiments, the tire comprises more than one tire body. Typically, the tire comprises a limited number of tire bodies such as up to about 5 or 6 tire bodies over the full width of the tire. The tire bodies can have different widths whereby no two tire bodies need be the same width.

In preferred embodiments, the tire comprises a recess between the inner surface of the tire and ones of the first and second side surfaces, the recess defining a side-facing recess surface thereof, the first side flange comprising a relatively greater diameter portion of the outer surface of the wheel adjacent the respective first or second side of the wheel and including an abutment surface facing inwardly of the respective first or second side of the wheel, the abutment surface of the wheel abutting the side-facing surface of the tire thereby to impede transverse movement of the tire with respect to the wheel.

In some embodiments, the tire comprises first and second recesses between the inner surface of the tire and the first and second side surfaces, the recesses defining respective first and second side-facing recess surfaces thereof, the first and second side flanges comprising respective first and second relatively greater diameter portions of the outer surface of the wheel adjacent the respective first and second sides of the wheel and including first and second abutment surfaces facing away from the respective first and second sides of the wheel, the first and second abutment surfaces of the wheel abutting the first and second side-facing surfaces of the tire thereby to impede transverse movement of the tire with respect to the wheel.

In preferred embodiments, the outer surface of the tire defines the entirety of an outer surface of the wheel assembly.

Also in preferred embodiments, the wheel assembly is free from adhesive at the wheel-tire interface.

Still addressing preferred embodiments, the auxiliary wheel body preferably has apertures extending therethrough along the width thereof, receiving fasteners removably affixing the auxiliary wheel body to the main wheel body.

In highly preferred embodiments, the second side flange is an integral part of the auxiliary wheel body and comprises a relatively greater diameter portion of the outer surface of the auxiliary wheel body adjacent the fourth side.

Also in highly preferred embodiments, the first side flange is an integral part of the main wheel body and the second side flange is an integral part of the auxiliary wheel body, the first and second side flanges comprising relatively greater diameter portions of the outer surface of the wheel adjacent the first and fourth sides, and the tire optionally comprises first and second recesses in an exterior of the tire between the inner surface and the first and second side surfaces of the tire, the first and second recesses each defining a side-facing recess surface thereof, the first and second abutment surfaces of the first and second side flanges abutting the respective side-facing surfaces of the first and second recesses.

The invention also comprehends an endless track drive system, and a tracked vehicle. The drive system of such tracked vehicle comprises a prime mover, an endless track mounted about a plurality of wheels, and a drive train transferring drive power from the prime mover to at least one of the wheels, at least one of the plurality of wheels comprising a novel wheel assembly as described herein.

In such track drive systems and such tracked vehicles the wheel assemblies of the invention can be used e.g. as leading idler wheels, as mid-wheel rollers, and optionally as drive wheels.

Figure 1:
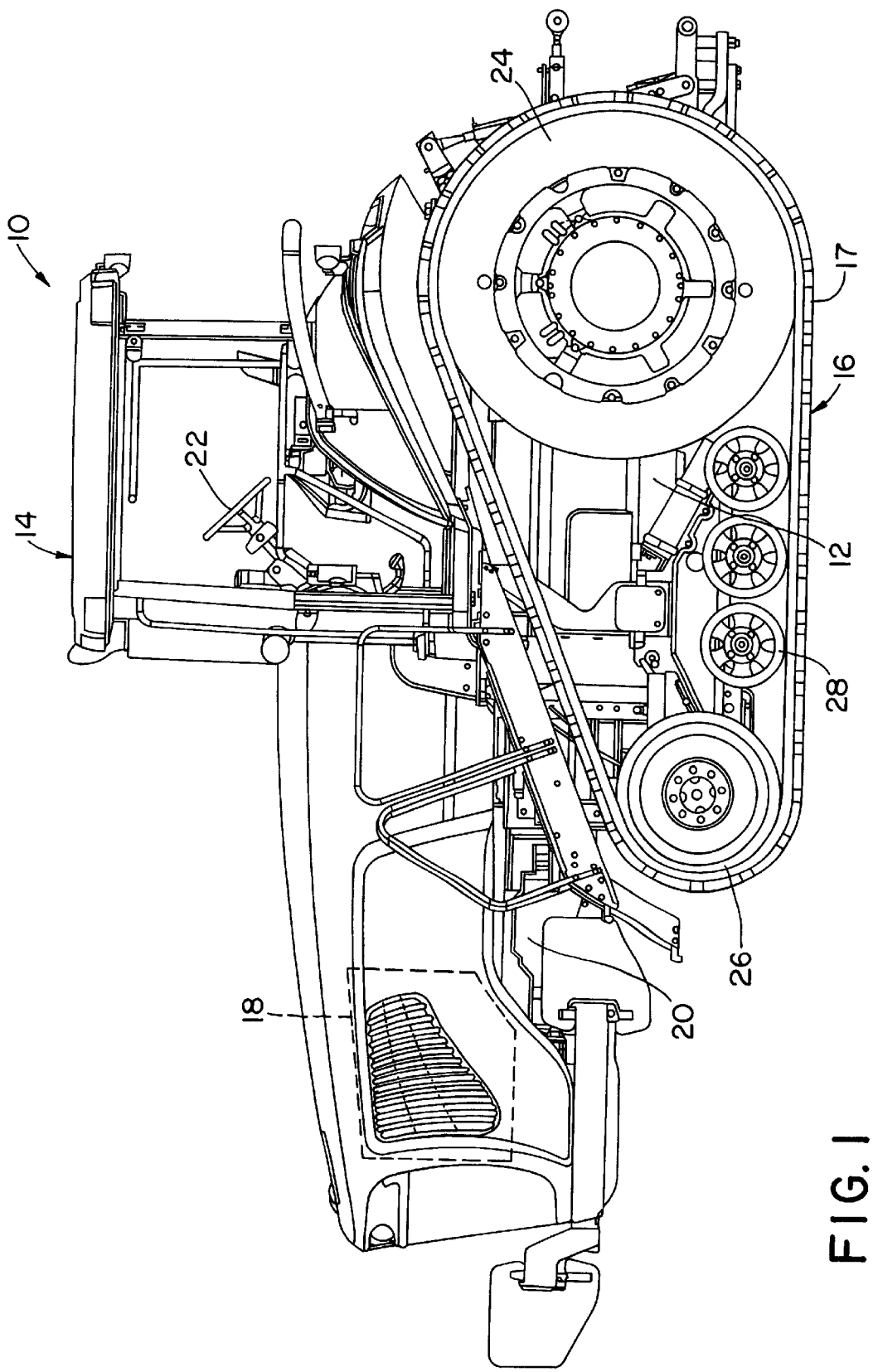
FIG. 1 shows a side pictorial view of a tracked agricultural vehicle employing the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring to FIG. 1, a tracked agricultural tractor 10 includes a frame 12, an operator cab 14, a track assembly 16 including a track 17, an engine 18, a drive train 20 which transfers power from the engine to the track assembly, and various controls 22 in the cab for controlling the driving and other operations of the tractor.

Track assembly 16, shown on the left side of the tractor, includes a drive wheel assembly 24, an idler wheel assembly 26, and mid-roller wheel assemblies 28, three of which are shown. A complementary second track assembly 16 (not shown) is located on the right side of the tractor, whereby the two track assemblies, in combination, are used to support, drive, and steer the tractor.

Drive wheel assemblies 24 are used to drive the tractor, and are typically used in steering the tractor, as well as in supporting the tractor from the ground. The drive wheel assemblies are generally more robust, larger, and more complex than either the idler wheel assemblies or the mid-roller wheel assemblies.

Idler wheel assemblies 26 are generally larger than the mid-roller wheel assemblies, in order to tolerate the steering stresses placed on the idler wheel assemblies, as well as the stresses of turning the track about an angle approaching, but typically less than, 180 degrees. Accordingly, while the idler wheel assemblies must be reasonably robust, the idler wheel assemblies do not need structure involved in driving the tractor, whereby the idler wheel assemblies can typically be less robust than the driving wheel assemblies.

Mid-roller wheel assemblies 28 are positioned between a driving wheel assembly and a respective idler wheel assembly, and support the track from the frame thus to expand the effective ground-engaging area by which the track supports the tractor from the ground, thereby to limit e.g. the ground loading, compression effected by the tractor.

Figure 2:
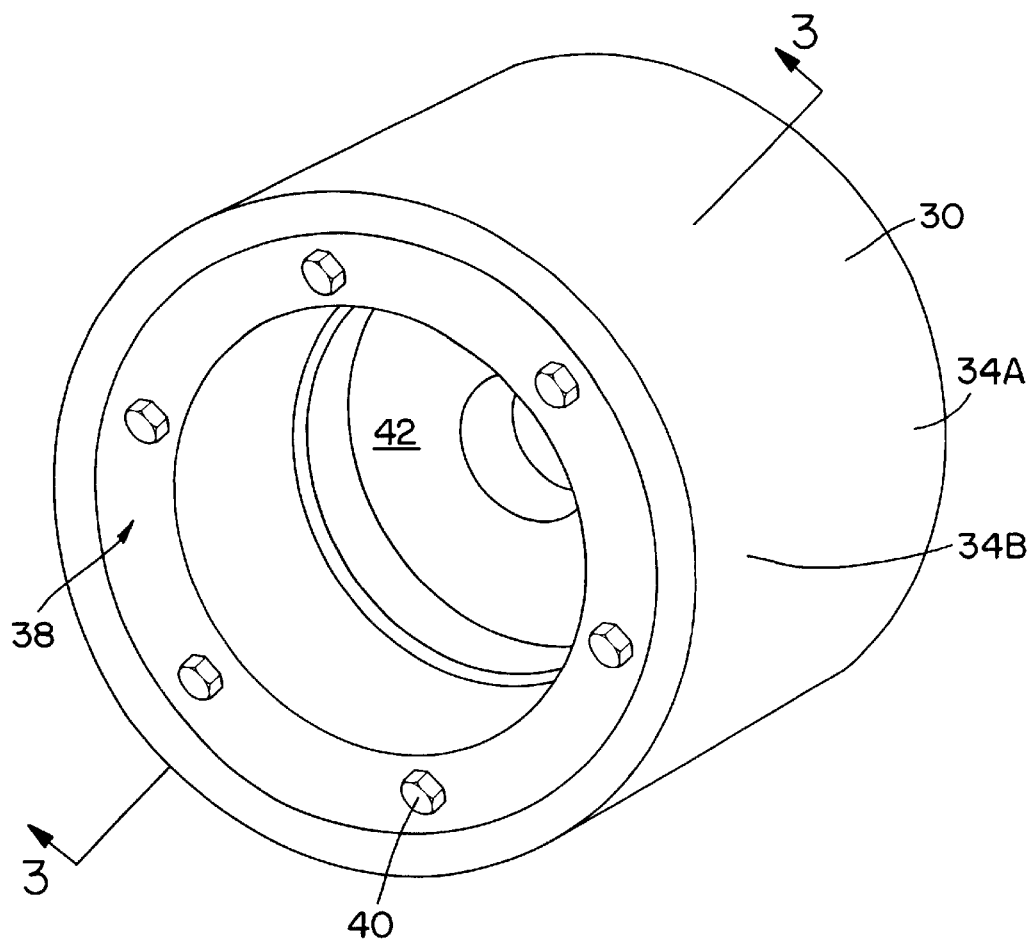
FIG. 2 shows a pictorial view of a wheel assembly used in track drive systems of the invention.
Figure 3:
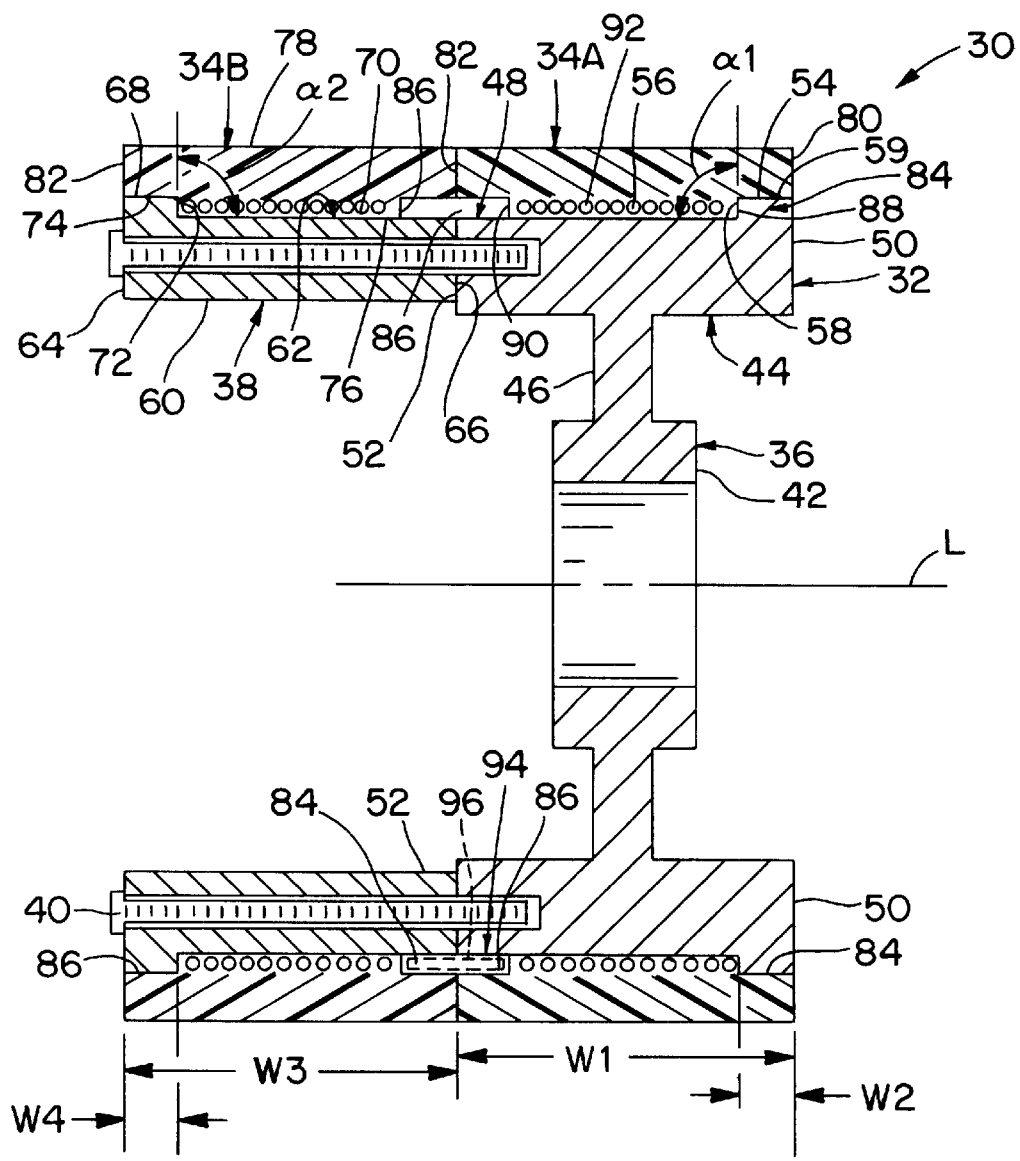
FIG. 3 shows a cross-section of a novel wheel assembly of the invention and is taken at 3—3 of FIG. 2.

Referring now to FIGS. 2 and 3, a wheel assembly 30 includes a wheel 32 and a pair of tire bodies 34A and 34B. Wheel 32 includes a main wheel body 36 and an auxiliary wheel body 38. Auxiliary wheel body 38 is removably mounted to the main wheel body by a plurality of retaining bolts 40.

Main wheel body 36 includes an inner flange 42 for interfacing with a wheel hub (not show), an outer flange 44, and a web 46 connecting the inner flange to the outer flange.

Inner flange 42 generally defines a cylindrical opening for receiving a hub, a shaft, and the like. The inner flange configuration is generally not critical to operation of the invention whereby a wide variety of inner flange configurations can be used in the invention.

The design of web 46 is generally not critical to operation of the invention whereby web 46 can be any known design.

The structure of the main wheel body at outer flange 44, and the use of the auxiliary wheel body in the structure of the wheel, are critical to the invention. As seen in FIGS. 2 and 3 collectively, outer flange 44 of the main wheel body has an outer surface 48 which corresponds in diameter generally to the diameter of the outer surface of the main wheel body. The outer flange of the main wheel body further has a right side 50 and an opposing left side 52, and a width "W1" between the right and left sides 50 and 52.

Outer surface 48 includes a first greater diameter portion 54 and a second lesser diameter portion 56. As seen in FIG. 3, greater diameter portion 54 extends upwardly as an extension of right side 50, and to the left of the distal edge of side 50, thus to define a portion of the outer surface 48 of the flange. The greater diameter portion 54 has a width "W2" which extends along less than 40 percent of the width "W1" of the outer flange of the main wheel body. Typically, the greater diameter portion 54 extends along about 10 percent to about 30 percent, preferably about 20 percent to about 25 percent, of the width of the wheel. Correspondingly, the lesser diameter portion of the outer surface of the outer flange of the main wheel body generally comprises at least 70 percent, up to about 90 percent, of the width "W1 " of the outer surface, preferably about 70 to about 80 percent, including about 75 percent, of the outer surface.

At the left edge of greater diameter portion 54, as seen in FIG. 3, the outer surface of the outer flange extends toward the lesser diameter portion at a perpendicular angle "α1" to the lesser diameter portion, forming an abutment surface 58. A leg of the angle is disposed between abutment surface 58 and the center of the outer surface of the outer flange, whereby abutment surface 58 interfaces with tire body 34A as discussed further hereinafter. The above-described structure of the greater diameter portion of the outer surface effectively defines a first side flange 59 which is integral with the outer flange of the main wheel body, wherein the side flange is in part defined by side surface 50 of the outer flange and is in part defined by the outer surface 48 of the outer flange. Where desired, greater diameter portion 54 can include greater and/or lesser diameter portions along the width between abutment surface 58 and side 50. Such varying diameters are generally diameters greater than the nominal diameter value of lesser diameter portion 56.

The lower portion of abutment surface 58 intersects lesser diameter portion 56 of outer surface 48. Lesser diameter portion 56 extends from abutment surface 58 toward left side 52 of outer flange 44. In the embodiment shown, the lesser diameter portion has a constant diameter, and extends uninterrupted to side 52. Where desired, lesser diameter portion 56 can include greater and/or lesser diameter portions along the width between abutment surface 58 and side 52. Such varying diameters are generally diameters having values less than the nominal diameter value of greater diameter portion 54.

As illustrated in FIG. 3, auxiliary wheel body 38 has an annular structure defining a second inner surface 60, a second outer surface 62, third and fourth opposing sides 64 and 66, and a width "W3" between sides 64, 66. The auxiliary wheel body is removably mounted to the main wheel body by threaded bolts 40, with the right side 66 of the auxiliary wheel body disposed against the left side 52 of the main wheel body. The combination of the width "W1" of the main wheel body and the width "W3" of the auxiliary wheel body defines the overall width of the wheel at the outer surface, the overall width of the wheel being at least about 30 percent greater than the width "W1" of the outer surface of the main wheel body.

Outer surface 62 includes a third greater diameter portion 68 and a fourth lesser diameter portion 70. As illustrated in FIG. 3, greater diameter portion 68 extends upwardly as an extension of left side 64 of the auxiliary wheel body, and to the right of the distal edge of side 64, thus to define a portion of the outer surface 62 of the flange. The greater diameter portion 68 has a width "W4" which extends along less than 40 percent of the width "W3" of the auxiliary wheel body. Typically, the greater diameter portion 68 extends along about 10 percent to about 30 percent, preferably about 20 percent to about 25 percent, of the width of the auxiliary wheel body. Where "W3" is substantially less than "W1," the fraction represented by the greater diameter portion is measured against "W1."

Given the greater diameter portions, the lesser diameter portion of the outer surface of the auxiliary wheel body generally comprises at least 70 percent, up to about 90 percent, of the width "W3" of the auxiliary wheel body, preferably about 70 percent to about 80 percent, including about 75 percent, of the outer surface.

At the right edge of greater diameter portion 68, the outer surface of the auxiliary wheel body extends toward the lesser diameter portion at a perpendicular angle "α2" to the lesser diameter portion, thus to form an abutment surface 72. A leg of the angle is disposed between the abutment surface and the center of the outer surface of the auxiliary wheel body, whereby abutment surface 72 interfaces with tire body 34B as discussed further hereinafter.

The above-described structure of the greater diameter portion of the outer surface of the auxiliary wheel body effectively defines a second side flange 74 which is integral with the outer surface of the auxiliary wheel body, wherein the side flange is in part defined by the side surface of the auxiliary wheel body and is in part defined by the outer surface of the auxiliary wheel body. Where desired, greater diameter portion 68 can include greater and/or lesser diameter portions along the width between abutment surface 72 and side 64. Such variations are generally diameters greater than the nominal diameter of lesser diameter portion 70.

The lower portion of abutment surface 72 intersects lesser diameter portion 70 of outer surface 62. Lesser diameter portion 70 extends from abutment surface 72 toward right side 66 of auxiliary wheel body 38. In the embodiment shown in FIG. 3, the lesser diameter portion has a constant diameter, and extends uninterrupted to right side 66. Where desired, lesser diameter portion 72 can include greater and/or lesser diameter portions along the width between abutment surface 72 and side 66. Such variations are diameters less than the nominal diameter of greater diameter portion 70.

In general, the outer surface of the auxiliary wheel body reflects and complements the outer surface of the main wheel body, whereby the lesser diameter portions of the outer surfaces of the main wheel body and the auxiliary wheel body generally define a common outer surface of the wheel, and the greater diameter portions of the main wheel body and the auxiliary wheel body define complementary left and right side flanges integral with the auxiliary wheel body and the main wheel body, and wherein the respective side flanges typically represent mirror images of each other.

To the contrary, side flanges 59 and 74 can have first and second different structures. For example, either or both of the side flanges can be structures separate and distinct from the respective main wheel body or auxiliary wheel body, and can be mounted to the respective wheel body by bolts or other fasteners (not shown), whereby the use of greater diameter portions of the outer surfaces are obviated. Whatever the structures of the side flanges, whatever the structures of the outer surfaces, the side flanges extend outwardly of longitudinal axis "L" of wheel 32 from a relatively lower extending portion of the outer surface thus to retain the tire bodies on the wheel. Longitudinal axis "L" is the center of rotation of both the main wheel body and the auxiliary wheel body.

Referring especially to FIG. 3, each of tire bodies 34A, 34B is a non-pneumatic, unitary article. Tire body 34A will be described in detail. Tire body 34B is the same as tire body 34A. Tire body 34A has an exterior which defines an inner surface 76, an outer surface 78, first side surface 80, second side surface 82, and first and second recesses 84 and 86 extending inwardly of the tire body between the inner surface and respective ones of the side surfaces. In the illustrated embodiments, and as preferred, the outer surface of the tire body defines the entirety of the outer surface of the wheel assembly, such that any portion of the outer surface of the wheel assembly, or all of the outer surface of the wheel assembly, can be used as an interfacial surface for frictional engagement with track 17, thus to drive and support the track.

Recesses 84 and 86 in tire body 34A define respective side-facing surfaces 88, 90. Side-facing surface 88 interfaces with abutment surface 58 of flange 59. A similar side-facing surface on tire body 34B interfaces with abutment surface 72 of flange 74. Such interfacing of the side-facing surfaces of the tire body and the abutment surfaces of the wheel stabilize tire bodies 34A and 34B with respect to the wheel. Complementary abutment of the two tire bodies against each other at respective inwardly-facing side surfaces of the tire bodies completes the stabilizing elements which control, transverse movements of the tire bodies with respect to the wheel.

A plurality of cables 92, such as steel cables, nylon cables, or polyester cables, are embedded in, molded into, tire bodies 34A, 34B adjacent the inner surfaces of the tire bodies. Such cables can represent single or multiple strand cable material, woven cable elements, and/or nonwoven e.g. randomly formed webs of cable material.

Elongation properties of cables 92 are such as to limit expansion of the diameters of the tire bodies at the inner surfaces of the tire bodies. The diameter of the cable material is sufficiently small that the longitudinal axes of the cable elements are below the tops of the side flanges, such that retention action of the side flanges preferably acts outwardly, in the wheel assembly, of the center of mass of the cables, whereby the cooperative interaction between the side flanges and the tire bodies, in combination, tends to urge the cables inwardly toward the outer surface of the wheel. In accord with such interface, the inner surfaces of the tire bodies are discouraged from expanding to the outer diameter limits of the side flanges, whereby the side flanges are effective to retain the tire bodies transversely stable on wheel 32. To that end, preferred cable material can be selected from among those materials known for use in controlling such use in tires. Steel cable material is preferred.

Overall, the stretching capabilities of the tire body elastomeric material and the limited stretching properties of the cables, in combination, are effective to prevent the tire body from stretching radially so as to increase the diameter at the inner surface enough to enable the tire body to translate transversely over one of the side flanges and thus off the wheel.

In the context of retaining the tire body transversely stable on wheel 32, the 152; magnitudes of angles "α1" and "α2" can be as small as about 45 degrees up to as great as about 135 degrees. Below 45 degrees, the wearability of the interface can tend to be limited. At greater than 135 degrees, the abutment interfaces can enable a tire body to slip up and over one of the side flanges during use of the wheel assembly. Preferred angles are between about 60 degrees and about 120 degrees. More preferred angles are about 75 degrees to about 105 degrees. The illustrated angle is 90 degrees.

In an embodiment (not shown), the side surfaces of the tire bodies and the flanges can be designed with any of a wide variety of cooperative interfacial surface structures so as to positively lock the tire bodies to the side flange interfaces.

While adhesive can be used at the interfaces between the inner surfaces of the tire bodies and the outer surfaces of the respective ones of the main wheel body and the auxiliary wheel body, and while compatible such adhesives are well known in the art, no adhesive need be used in the invention. Indeed, adhesive is preferably not used.

Rather, securing a suitable interface between the tire bodies and the wheel is achieved by selecting suitable cooperative diameters for the inner surfaces of the tire bodies and the outer surface of the wheel as well as by selecting suitable materials for both the wheel and the tire bodies. Such suitable interfacial diameters optionally include a difference in diameter with the diameter of the inner surface of the tire body being the greater of the diameters by e.g. about −0.02 inch to about +0.04 inch. The maximum range of differences depends on the radial elongation, e.g diameter expansion, capabilities of the tire body. Where there is an interference fit, the tire body is stretched appropriately when installed on the wheel and then is allowed to resiliently relax thereby to firmly grip the wheel by friction. Where there is a positive diameter difference, some modest slippage is tolerated between tire and wheel when no load, or a modest load, is being applied to the wheel assembly.

Whatever the relationships of the diameters of the tire body and wheel, the critical relationship is that the tire body should not be so loose as to be readily pushed off the wheel with the second side flange secured in place.

The tire bodies are mounted to wheel 32 as follows. Starting with the auxiliary wheel body removed from the main wheel body, tire body 34A is slid transversely onto the outer surface of the outer flange of the main wheel body, from the direction of left side 52. In the process, the tire body is expanded as necessary to account for and accommodate any interference in the fit between the tire body and the main body of the wheel. The tire body is slid along outer surface 48 until side facing surface 88 of the tire body comes into abutting relationship with abutment surface 58 of side flange 59, whereby the side flange 59 preferably comes into a full, interfacial relationship with the respective first recess.

Tire body 34B is mounted to the outer surface of the auxiliary wheel body in the same manner. The right side of the auxiliary wheel body is then brought into facing relationship with the left side of the main wheel body. Bolts 40 are installed, through the auxiliary wheel body and into the main wheel body, thus removably mounting and securing the auxiliary wheel body to the main wheel body. Bolts 40 are tightened as needed to bring the auxiliary wheel body into a rigid mounting relationship with the main wheel body, and wherein the auxiliary wheel body acts as one with the main wheel body to assist in distributing the weight and other stresses imposed on a track which is wider than the main wheel body, over a width which is more representative of the width of the track than can be accomplished by mounting such track to the main wheel body in the absence of the auxiliary wheel body.

With the auxiliary wheel body thus mounted to the main wheel body, the opposing side flanges 59 and 74, and the facing side surfaces of the tire bodies 34A, 34B mutually support the tire bodies on the wheel against transverse movement of either of the tire bodies with respect to the wheel, while the tire bodies are also prevented from undesirable radial expansion by cables 92.

While tire bodies 34A, 34B are preferably not adhered to the wheel bodies, the wheel and tire bodies are still caused to act generally as a single unit when a load is applied as between the track and the wheel assembly. In such loaded environment, the radial loading applied by the track against the outer surfaces of the tire bodies causes frictional engagement between the outer surface of the wheel and the inner surfaces of the tire bodies. Those skilled in the art can select suitable rubber or other elastomer materials such as certain rubber or polyurethane polymers, for use in the tire bodies, to obtain desirable properties of resilience to e.g. cushion shocks otherwise transmitted from the ground throughout the vehicle, and friction engagement between the wheel and the tire bodies, and between the tire bodies and the track.

As a corollary to the above installation procedure, to replace the tire bodies, bolts 40 are removed, auxiliary wheel body 38 is removed from the main wheel body.

The tire bodies are slid transversely off both the main wheel body and the auxiliary wheel body. New tire bodies are installed on the main wheel body and the auxiliary wheel body. The auxiliary wheel body is then remounted, and re-secured, to the main wheel body.

Wheel assemblies of the invention, as described above, are well suited for use in any of the wheel functions of tracked vehicles, including drive wheel assemblies, idler wheel assemblies, mid-roller wheel assemblies, and tensioning wheel assemblies.

Referring to FIG. 3, and to the recesses at the abutting surfaces of tire bodies 34A, 34B, the invention contemplates a wide range of interacting surface configurations at the edges of tire bodies 34A, 34B which meet adjacent the middle of the outer surface of the wheel assembly. To that end, the recesses shown can be deleted such that the edges of the tire bodies meet in abutment over the full thicknesses of the tire bodies between the inner surfaces of the tire bodies and the outer surfaces of the tire bodies.

Still referring to FIG. 3, recess 86 at the left edge of tire body 34A and recess 84 at the right edge of tire body 34B, in combination define an open annular and continuous space 94 extending about the circumference of the wheel assembly between the outer surface of the wheel and the outwardly disposed surfaces of the recesses. In some embodiments, a spacer ring 96, shown in dashed outline in FIG. 3, is optionally employed as a filler in space 94 to attenuate deflection of the tire bodies into such space. To that end, spacer ring 96 is sized and configured to essentially fill space 94.

The material of spacer ring 96, where used, can be selected from a wide range of materials. Typically, the purpose of such spacer ring is to control compression of the tire bodies, whereby a rigid material, such as steel or other metal is selected for use in fabrication of the spacer ring. In other embodiments, certain polymeric materials can be effectively employed, for example the same elastomeric material as the elastomeric material used in the general composition of the tire bodies. Still other polymeric, metal, ceramic, or other suitable materials can be used as fillers to fill such space.

Figure 4:
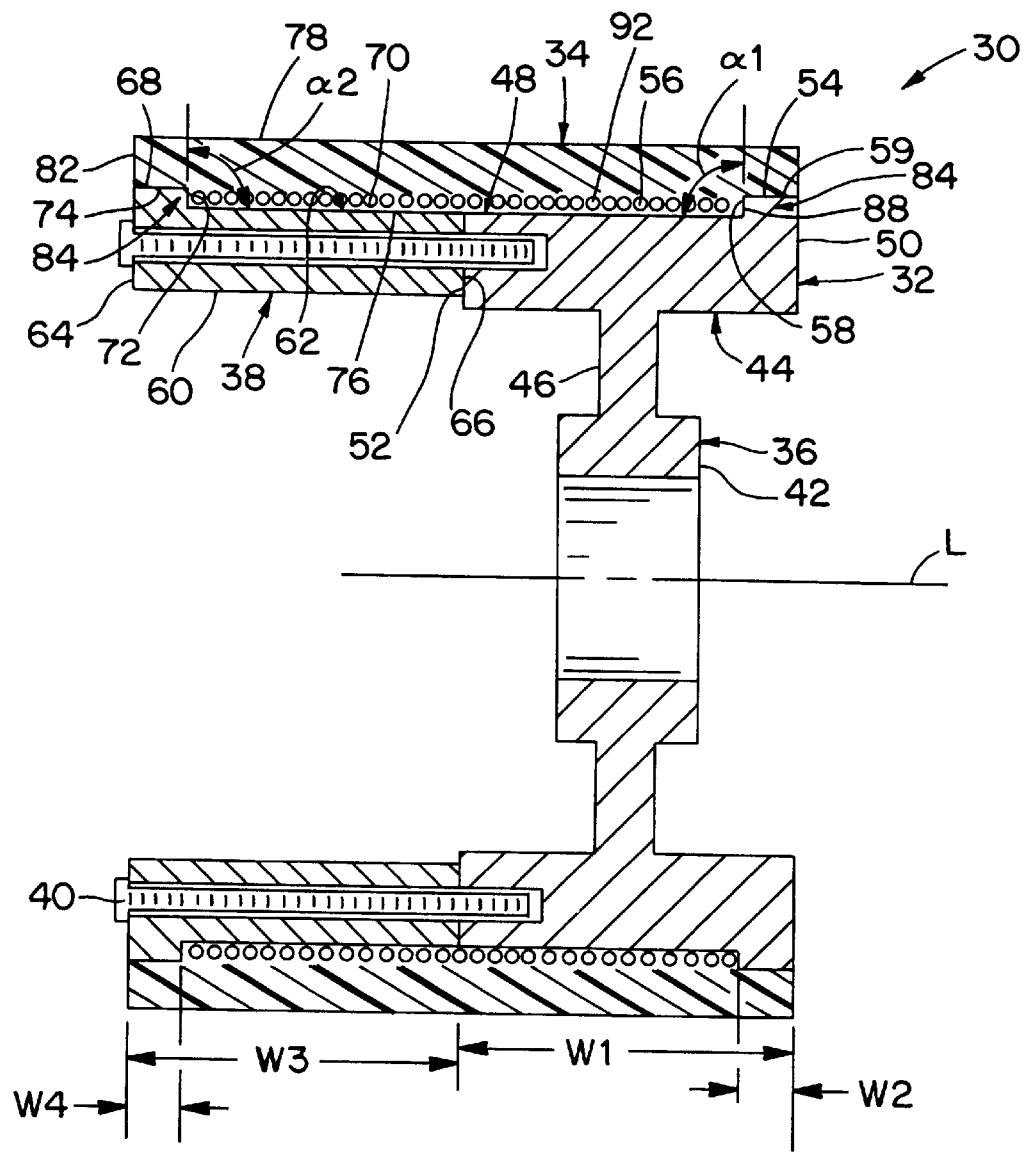
FIG. 4 shows a cross-section as in FIG. 3 of a second embodiment of the wheel assembly of the invention, employing a single tire body.

In yet another embodiment illustrated in FIG. 4, the twin tire bodies 34A, 34B of FIG. 3 are replaced with a single tire body 34 which extends the entirety of that width of the wheel which is occupied by the tire. Such tire, whether a single tire body or two tire bodies, or more than two tire bodies, can extend the full width of the wheel, can extend a width somewhat greater than the full width of the wheel, or can extend less than the full width of the wheel. In preferred embodiments, the width of the tire is commensurate with the width of the wheel, whereby the entirety of the width of the tire is supported by the outer surface of the wheel while the tire presents the entirety of the width of the wheel to the track for track support.

In any event, the backing and support provided by the auxiliary wheel body serves to provide, at the track, a uniformity of pressure, across the width of the track, which is greater than the uniformity available to that track, using that track drive system, without use of the auxiliary wheel body.

Returning to FIG. 4, where a single tire body is used, preferably both of side flanges 59 and 74 interact with the side edges, optionally with the side surfaces, of the single tire body which is associated with respective recesses corresponding to recesses 84, 86.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A wheel assembly for use in an endless track drive system, said wheel assembly comprising:
   (a) a wheel comprising
      (i) a main wheel body having a first center of rotation, an inner flange defining a central opening for mounting said main wheel body to an axle for rotation of said wheel on such axle and about the first center of rotation, an outer flange having first and second opposing sides, a first width of the outer surface between the first and second sides, a first inner surface, and a first outer surface, and a web connecting said inner flange to said outer flange, said outer flange having a first overall width between the first and second opposing sides, and
      (ii) an auxiliary wheel body having an annular structure defining a second inner surface, a second outer surface, third and fourth opposing sides, and a second width of the outer surface between the third and fourth sides, the auxiliary wheel body being removably mounted to the main wheel body with the third side surface of said auxiliary wheel body disposed against the second side surface of said main wheel body, the combination of the widths of said main wheel body and said auxiliary wheel body defining a third overall width of the outer surface of the wheel, the third overall width being at least about 30 percent greater than the first width, said auxiliary wheel body having a second center of rotation axially aligned with the first center of rotation,
   the first and second outer surfaces of said main wheel body and said auxiliary wheel body in combination defining an outer surface of said wheel having a generally common outer diameter, a central portion, and opposing ends at the first side of said main wheel body and the fourth side of said auxiliary wheel body,
   (b) a tire comprising one or more tire bodies, said tire having an exterior, the tire exterior comprising an inner surface, an outer surface, and first and second side surfaces extending generally from the outer surface toward the inner surface, said tire further comprising a plurality of cables proximate the inner surface of said tire, embedded in said elastomeric material, the cables in combination being effective to limit radial stretching of said tire,
   the outer surface of said wheel receiving the inner surface of said tire thereon at a wheel-tire interface,
   (c) a first side flange at the first side of the main wheel body extending outwardly of the outer surface of said wheel to a distal edge inward of the outer surface of said tire, said first side flange comprising a first abutment surface facing away from the first side surface, and
   (d) a second side flange at the fourth side of the auxiliary wheel body extending outwardly of the outer surface of said wheel to a distal edge inward of the outer surface of said tire, said second side flange comprising a second abutment surface facing inwardly of the fourth side surface, the first and second abutment surfaces of said first and second side flanges abutting the first and second side-facing surfaces of said tire, thereby to effectively impede transverse movement of the tire off the wheel while the auxiliary wheel body is mounted to the main wheel body while releasing such impediment such that said tire can be removed transversely from said wheel when said auxiliary wheel body is dismounted from said main wheel body, and enabling subsequently sliding a fresh such tire onto the outer surface of said main wheel body followed by again removably mounting said auxiliary wheel body to said main wheel body.

2. A wheel assembly as in claim 1, said tire comprising a single tire body.

3. A wheel assembly as in claim 1, said tire comprising more than one tire body.

4. A wheel assembly as in claim 1, said tire comprising a recess between the inner surface of said tire and ones of said first and second side surfaces, the recess defining a side-facing recess surface thereof, said first side flange comprising a relatively greater diameter portion of the outer surface of said wheel adjacent the respective first or second side of said wheel and including an abutment surface facing away from the respective first or second side of said wheel, the abutment surface of the wheel abutting the side-facing surface of said tire thereby to impede transverse movement of the tire with respect to said wheel.

5. A wheel assembly as in claim 1, said tire comprising first and second recesses between the inner surface of said tire and the first and second side surfaces, the recesses defining respective first and second side-facing recess surfaces thereof, said first and second side flanges comprising respective first and second relatively greater diameter portions of the outer surface of said wheel adjacent the respective first and second sides of said wheel and including first and second abutment surfaces facing away from the respective first and second sides of said wheel, the first and second abutment surfaces of the wheel abutting the first and second side-facing surfaces of said tire thereby to impede transverse movement of the tire with respect to said wheel.

6. A wheel assembly as in claim 1 wherein the outer surface of the tire defines the entirety of an outer surface of said wheel assembly.

7. A wheel assembly as in claim 1, said wheel assembly being free from adhesive at the wheel-tire interface.

8. A wheel assembly as in claim 1, said auxiliary wheel body having apertures extending therethrough along the width thereof, receiving fasteners removably affixing said auxiliary wheel body to said main wheel body.

9. A wheel assembly as in claim 1, said second side flange being an integral part of said auxiliary wheel body and comprising a relatively greater diameter portion of the outer surface of said auxiliary wheel body adjacent the fourth side.

10. A wheel assembly as in claim 1, said first side flange being an integral part of said main wheel body and said second side flange being an integral part of said auxiliary wheel body, said first and second side flanges comprising relatively greater diameter portions of the outer surface of said wheel adjacent the first and fourth sides.

11. A wheel assembly as in claim 10, said tire comprising first and second recesses in an exterior of said tire between the inner surface and the first and second side surfaces of said tire, the first and second recesses each defining a side-facing recess surface thereof, the first and second abutment surfaces of said first and second side flanges abutting the respective side-facing surfaces of the first and second recesses.

12. An endless track drive system, said drive system comprising a prime mover, an endless track mounted about a plurality of wheels, and a drive train transferring drive power from the prime mover to at least one of the wheels, at least one of the plurality of wheels comprising a wheel assembly of claim 1.

13. A tracked vehicle comprising a frame, a prime mover, a track assembly, and a drive train transferring drive power from the prime mover to the track assembly, said track assembly comprising an endless track and a plurality of wheels about which said endless track is mounted, at least one of said wheels comprising a wheel assembly of claim 1.

14. A tracked vehicle as in claim 13 wherein said wheel assembly is a leading idler wheel.

15. A tracked vehicle as in claim 13 wherein said wheel assembly is a mid-wheel roller.

16. A wheel assembly for use in an endless track drive system, said wheel assembly comprising:
(a) a wheel comprising
(i) a main wheel body having a first center of rotation, an inner flange defining a central opening for mounting said main wheel body to an axle for rotation of said wheel on such axle and about the first center of rotation, an outer flange having first and second opposing sides, a first width of the outer surface between the first and second sides, a first inner surface, and a first outer surface, and a web connecting said inner flange to said outer flange, said outer flange having a first overall width between the first and second opposing sides, and
(ii) an auxiliary wheel body having an annular structure defining a second inner surface, a second outer surface, third and fourth sides, the auxiliary wheel body being removably mounted to the main wheel body with the third side surface of said auxiliary wheel body disposed against the second side surface of said main wheel body to form a joint thereat, the combination of the first and second widths defining a third width of the outer surface of the wheel, the third width being at least about 30 percent greater than the first width, said auxiliary wheel body having a second center of rotation axially aligned with the first center of rotation, the first and second outer surfaces of said main wheel body and said auxiliary wheel body in combination defining an outer surface of said wheel extending at a generally constant outer diameter at the joint therebetween, the outer surface having a relatively lesser diameter central portion, and opposing ends at the first side of said main wheel body and the fourth side of said auxiliary wheel body, and relatively greater diameter side portions, comprising a first side flange at the second side, integral with the outer flange of said wheel, said second side flange having a second greater diameter than the first diameter and comprising a first abutment surface facing toward a center of the outer surface, (b) a tire comprising one or more tire bodies, said tire having an exterior, the tire exterior comprising an inner surface, an outer surface, and first and second side surfaces extending generally from the outer surface toward the inner surface, said tire further comprising a plurality of cables proximate the inner surface of said tire, embedded in said elastomeric material, the outer surface of said wheel receiving the inner surface of said tire thereon at a wheel-tire interface, and (c) a second side flange at the fourth side of the auxiliary wheel body extending outwardly of the outer surface of said wheel to a distal edge inward of the outer surface of said tire, said second side flange comprising a second abutment surface facing away from the fourth side surface, the difference between magnitudes of the first and second diameters being greater than the radial stretch capability of the combination of said cables and the elastomeric material in said tire, thereby to prevent transverse movement of the tire off the wheel while the auxiliary wheel body is mounted to said wheel.

17. A wheel assembly as in claim 16, said tire comprising a single tire body.

18. A wheel assembly as in claim 16, said tire comprising more than one tire body.

19. A wheel assembly as in claim 16, said tire comprising a recess between the inner surface of said tire and ones of said first and second side surfaces, the recess defining a side-facing recess surface thereof, said first side flange comprising a relatively greater diameter portion of the outer surface of said wheel adjacent the respective first or second side of said wheel and including an abutment surface facing away from the respective first or second side of said wheel, the abutment surface of the wheel abutting the side-facing surface of said tire thereby to impede transverse movement of the tire with respect to said wheel.

20. A wheel assembly as in claim 16, said tire comprising first and second recesses between the inner surface of said tire and the first and second side surfaces, the recesses defining respective first and second side-facing recess surfaces thereof, said first and second side flanges comprising respective first and second relatively greater diameter portions of the outer surface of said wheel adjacent the respective first and second sides of said wheel and including first and second abutment surfaces facing away from the respective first and second sides of said wheel, the first and second abutment surfaces of the wheel abutting the first and second side-facing surfaces of said tire thereby to impede transverse movement of the tire with respect to said wheel.

21. A wheel assembly as in claim 16 wherein the outer surface of the tire defines the entirety of an outer surface of said wheel assembly.

22. A wheel assembly as in claim 16, said wheel assembly being free from adhesive at the wheel-tire interface.

23. A wheel assembly as in claim 16, said auxiliary wheel body having apertures extending along the width thereof, receiving fasteners removably affixing said auxiliary wheel body to said main wheel body.

24. A wheel assembly as in claim 16, said second side flange being an integral part of said auxiliary wheel body and comprising a relatively greater diameter portion of the outer surface of said auxiliary wheel body adjacent the fourth side.

25. A wheel assembly as in claim 16, said first side flange being an integral part of said main wheel body and said second side flange being an integral part of said auxiliary wheel body, said first and second side flanges comprising relatively greater diameter portions of the outer surface of said wheel adjacent the first and fourth sides.

26. A wheel assembly as in claim 25, said tire comprising first and second recesses in an exterior of said tire between the inner surface and the first and second side surfaces of said tire, the first and second recesses each defining a side-facing recess surface thereof, the first and second abutment surfaces of said first and second side flanges abutting the respective side-facing surfaces of the first and second recesses.

27. An endless track drive system, said drive system comprising a prime mover, an endless track mounted about a plurality of wheels, and a drive train transferring drive power from the prime mover to at least one of the wheels, at least one of the plurality of wheels comprising a wheel assembly of claim 16.

28. A tracked vehicle comprising a frame, a prime mover, a track assembly, and a drive train transferring drive power from the prime mover to the track assembly, said track assembly comprising an endless track and a plurality of wheels about which said endless track is mounted, at least one of said wheels comprising a wheel assembly of claim 16.

* * * * *